(12) United States Patent
Roitel et al.

(10) Patent No.: US 11,035,484 B2
(45) Date of Patent: Jun. 15, 2021

(54) WATER PURIFICATION AND DISPENSING SYSTEM AND METHOD

(71) Applicant: Merck Patent GmbH, Darmstadt (DE)

(72) Inventors: Pascal Roitel, Strasbourg (FR);
Christophe Paragot, Saclay (FR);
Laurent Moreau, Versailles (FR)

(73) Assignee: Merck Patent GmbH, Darmstadt (DE)

( * ) Notice: Subject to any disclaimer, the term of this patent is extended or adjusted under 35 U.S.C. 154(b) by 22 days.

(21) Appl. No.: 16/485,836

(22) PCT Filed: Feb. 21, 2018

(86) PCT No.: PCT/EP2018/054219
§ 371 (c)(1),
(2) Date: Aug. 14, 2019

(87) PCT Pub. No.: WO2018/153886
PCT Pub. Date: Aug. 30, 2018

(65) Prior Publication Data
US 2020/0055743 A1 Feb. 20, 2020

(30) Foreign Application Priority Data

Feb. 24, 2017 (EP) ..................................... 17290027
Feb. 24, 2017 (EP) ..................................... 17290028
(Continued)

(51) Int. Cl.
*F16K 21/16* (2006.01)
*F16K 3/24* (2006.01)
(Continued)

(52) U.S. Cl.
CPC .............. *F16K 21/16* (2013.01); *C02F 1/001* (2013.01); *C02F 1/008* (2013.01); *C02F 1/32* (2013.01);
(Continued)

(58) Field of Classification Search
CPC ........ F16K 21/16; F16K 3/246; F16K 11/048; F16K 11/07; F16K 21/02; C02F 1/001;
(Continued)

(56) References Cited

U.S. PATENT DOCUMENTS 2,169,043 A  8/1939 Goehring
2,392,214 A  1/1946 Cruzan
(Continued)

FOREIGN PATENT DOCUMENTS

| CH | 414286 A | 5/1966 |
|----|----------|--------|
| EP | 1814007 A1 | 8/2007 |
| EP | 2592315 A1 | 5/2013 |

OTHER PUBLICATIONS

Office action dated Jul. 8, 2020 in co-pending U.S. Appl. No. 16/485,837.
(Continued)

*Primary Examiner* — Krishnan S Menon
(74) *Attorney, Agent, or Firm* — Nields, Lemack & Frame, LLC

(57) ABSTRACT

The invention provides a water purification and dispensing system, preferably for producing ultrapure water and offering the purified water at one or more dispensing sites in a desired volume. The water purification and dispensing system comprises a (closed) water recirculation loop including a water inlet for introducing water to be purified, pumping means for pumping water through said water recirculation loop in a flow direction, water purification means for purifying water downstream of said water inlet, a dispensing portion of the water recirculation loop including one or more outlet(s) for purified water branched from said water recirculation loop downstream of said water purification means, a first valve arranged between each outlet and said water recirculation loop, for controlled dispensing of the purified water from said recirculation loop through the respective
(Continued)

outlet, a second valve arranged in said dispensing portion of the water recirculation loop downstream of said first valve(s) and upstream of said pumping means, a bypass passage branched from said water recirculation loop and bypassing said dispensing portion of the water recirculation loop including said first valve(s) and said second valve, and a third valve for controlling the flow rate through said bypass passage.

14 Claims, 6 Drawing Sheets

(30) Foreign Application Priority Data

Feb. 27, 2017 (EP) .................................... 17290030
Feb. 27, 2017 (EP) .................................... 17290031

(51) Int. Cl.
| | |
|---|---|
| *F16K 11/048* | (2006.01) |
| *F16K 11/07* | (2006.01) |
| *C02F 1/00* | (2006.01) |
| *C02F 1/32* | (2006.01) |
| *C02F 1/42* | (2006.01) |
| *C02F 9/00* | (2006.01) |
| *C02F 103/04* | (2006.01) |

(52) U.S. Cl.
CPC .................. *C02F 1/42* (2013.01); *C02F 9/00* (2013.01); *F16K 3/246* (2013.01); *F16K 11/048* (2013.01); *F16K 11/07* (2013.01); *C02F 2001/427* (2013.01); *C02F 2103/04* (2013.01); *C02F 2201/005* (2013.01); *C02F 2201/006* (2013.01); *C02F 2209/005* (2013.01); *C02F 2209/40* (2013.01); *C02F 2301/043* (2013.01); *C02F 2301/046* (2013.01)

(58) Field of Classification Search
CPC .... C02F 1/008; C02F 1/32; C02F 1/42; C02F 9/00; C02F 2001/427; C02F 2103/04; C02F 2201/005; C02F 2201/006; C02F 2209/005; C02F 2209/40; C02F 2301/043
See application file for complete search history.

(56) References Cited

U.S. PATENT DOCUMENTS

| | | | |
|---|---|---|---|
| 2,682,386 A | 6/1954 | Lindsay | |
| 2,739,613 A | 3/1956 | Kulikoff | |
| 2,782,801 A | 2/1957 | Ludwig | |
| 2,933,285 A | 4/1960 | Tucker | |
| 3,329,165 A | 7/1967 | Lang | |
| 3,570,541 A | 3/1971 | Franz | |
| 3,581,764 A | 6/1971 | Fife | |
| 3,779,280 A | 12/1973 | Evans et al. | |
| 3,974,861 A | 8/1976 | Goto et al. | |
| 4,098,295 A | 7/1978 | Haytayan | |
| 4,269,224 A | 5/1981 | Dotti et al. | |
| 4,319,607 A | 3/1982 | Fields | |
| 4,398,562 A | 8/1983 | Saarem et al. | |
| 4,432,215 A | 2/1984 | Yoshida | |
| 5,007,458 A | 4/1991 | Marcus et al. | |
| 5,184,773 A | 2/1993 | Everingham | |
| 5,899,231 A | 5/1999 | Drori | |
| 6,148,861 A | 11/2000 | Finkeldei et al. | |
| 6,190,558 B1 | 2/2001 | Robbins | |
| 6,701,959 B1 | 3/2004 | Flynn et al. | |
| 7,329,358 B2 | 2/2008 | Wilkins et al. | |
| 7,392,971 B2 | 7/2008 | Biener | |
| 7,481,929 B2 | 1/2009 | Wilkins et al. | |
| 7,669,831 B2 | 3/2010 | Feigel | |
| 7,841,360 B2 | 11/2010 | Bruck et al. | |
| 7,846,340 B2 | 12/2010 | Freydina et al. | |
| 7,856,999 B2 | 12/2010 | Xiang et al. | |
| 7,862,710 B2 | 1/2011 | Kloos et al. | |
| 7,862,723 B2 | 1/2011 | Cartwright | |
| 7,938,956 B2 | 5/2011 | Gaignet | |
| 7,947,181 B2 | 5/2011 | Cartwright | |
| 8,045,849 B2 | 10/2011 | Zoccolante et al. | |
| 8,052,865 B2 | 11/2011 | Kloos et al. | |
| 8,568,585 B2 * | 10/2013 | Nolan | C02F 1/325 210/110 |
| 8,632,050 B2 | 1/2014 | Stoeckel et al. | |
| 8,939,173 B2 | 1/2015 | Yahr et al. | |
| 9,010,372 B2 | 4/2015 | Fangmeier | |
| 9,910,447 B2 | 3/2018 | Pettinaroli et al. | |
| 10,006,551 B2 | 6/2018 | Wilfong et al. | |
| 10,233,093 B2 | 3/2019 | Mueller et al. | |
| 10,508,745 B2 | 12/2019 | Groves et al. | |
| 2003/0116739 A1 | 6/2003 | Murao et al. | |
| 2005/0211938 A1 | 9/2005 | Ryuen et al. | |
| 2005/0218362 A1 | 10/2005 | Furuta et al. | |
| 2005/0218363 A1 | 10/2005 | Furuta et al. | |
| 2006/0021664 A1 | 2/2006 | Katsuta et al. | |
| 2007/0045580 A1 | 3/2007 | Okitsu | |
| 2007/0069172 A1 | 3/2007 | Brenner et al. | |
| 2010/0083676 A1 | 4/2010 | Merritt | |
| 2011/0121214 A1 | 5/2011 | Stoeckel et al. | |
| 2012/0012768 A1 | 1/2012 | Yahr et al. | |
| 2012/0061600 A1 | 3/2012 | Neff et al. | |
| 2012/0211686 A1 | 8/2012 | Okamoto | |
| 2013/0105720 A1 | 5/2013 | Kabel | |
| 2013/0105721 A1 | 5/2013 | Kabel et al. | |
| 2013/0263955 A1 | 10/2013 | Hirota | |
| 2013/0291975 A1 | 11/2013 | Fangmeier | |
| 2013/0340849 A1 | 12/2013 | Peel | |
| 2014/0027379 A1 | 1/2014 | Volker | |
| 2014/0097130 A1 | 4/2014 | Wilfong et al. | |
| 2016/0252185 A1 | 9/2016 | Wilfong et al. | |
| 2017/0276253 A1 | 9/2017 | Hironaka | |
| 2018/0335151 A1 | 11/2018 | Wilfong et al. | |
| 2019/0308887 A1 | 10/2019 | Mueller et al. | |
| 2019/0345051 A1 | 11/2019 | Keary | |
| 2020/0056715 A1 | 2/2020 | Moreau | |
| 2020/0141500 A1 | 5/2020 | Wilfong et al. | |

OTHER PUBLICATIONS

International Search Report and Written Opinion dated May 3, 2018 in corresponding PCT application No. PCT/EP2018/054219.
International Search Report and Written Opinion dated May 25, 2018 in co-pending PCT application No. PCT/EP2018/054225.
Notice of allowance dated Dec. 9, 2020 in co-pending U.S. Appl. No. 16/485,837.

* cited by examiner

WATER PURIFICATION AND DISPENSING SYSTEM AND METHOD

This invention concerns a water purification and dispensing system comprising a closed water recirculation loop, and a method of dispensing purified water from such a system.

PRIOR ART

A water purification system of the type to which the present invention pertains aims at producing preferably ultrapure water and offering the purified water at one or more dispensing sites in a desired volume. Ultrapure water can be defined as the highest quality reagent grade water that exceeds ASTM Type I standards and has a specific resistance of more than 18.0 MΩcm at 25° C. and a total organic carbon (TOC) content of less than five parts per billion (ppb).

Many applications require the use of ultrapure water, in particular in biological and chemical analysis laboratories. The components for purifying water in such a system according to the desired purity level are known as such. Depending on the volume of water required by the respective application or user the purification systems are required to distribute the purified water at or near a maximum treatment capacity and throughput, which can be for example, two or three litres per minute, or at a throughput that is lower than the maximum treatment capacity down to a drop-by-drop dispensing rate. In some applications it is necessary to deliver exactly as possible a predetermined volume of purified water and the measuring of the volume should be automated without the user being required to monitor and measure the dispensed volume.

What is generally needed is a water purification and dispensing system which can produce and selectively distribute and accurately dispense the purified water, preferably at the ultrapure level, at progressive rates from a large treatment throughput, for example to fill a container as quickly as possible, to low or very low throughput, for example to adjust the water level in a container, down to even a drop-by-drop rate. The system should, at the same time, be equipped to automatically and precisely distribute the purified water with a predefined volume, for example to fill certain containers with a predetermined exact volume.

A water purification and dispensing system and method for this purpose is, for example, disclosed in the document EP 1814007A1. The conceptual layout of the water purification and dispensing system disclosed in this document is shown in FIG. 2 and it comprises a closed water recirculation loop 106 supplied at a water inlet point with water to be purified and it has one or more outlet points of use of the purified water. The system also includes pumping means 103 and water purification means on the loop respectively downstream of the inlet point and upstream of the outlet points in the water flow direction through the loop. The water purification means typically includes a pre-treatment unit 151, an UV lamp 152, preferably operating at a wavelength of 185 nm, and a finishing or polishing cartridge 153. This known system includes two independent valves, a first valve on the loop upstream of the pumping means and a second valve respectively upstream of each point of use outlet point.

This system uses two-way solenoid valves as the first valve and one or more second valves, wherein one of them is provided as the first or recirculation valve in the recirculation loop, with no additional back-pressure device like a preloaded check valve, and the other(s) is/are provided as the second or dispensing valve(s) on the downstream side of the outlet from the water purification means for producing the purified water, for use in distributing the purified water at the respective dispensing sites. In this system recirculation occurs with the dispensing solenoid valve(s) being closed and the recirculation solenoid valve being open with no internal pressure in the purification loop, and dispensing occurs with the recirculation solenoid valve being closed and the dispensing solenoid valve(S) being open. The dispensing flow rate is controlled by the speed of the dispensing pump's DC motor. This configuration allows simultaneous manual dispensing by selectively operating the respective dispensing solenoid valve upstream of the respective points of use outlet points. A limitation of relying on the DC motor speed control for adjusting the dispensing volume or rate is, however, that very low flow rates like drop-by-drop cannot be performed as the DC motor cannot be controlled at a sufficiently low speed. Moreover, there is a certain delay or lag associated with a DC motor start up at a low voltage required for setting such a low speed. The document EP 1814007A1 discloses that very low dispensing flow rates are achieved by opening the recirculation solenoid valve while dispensing at the point of use outlet point. Nevertheless, it is not possible to control very low dispensing flow rates like drop-by-drop using such a setup as the dispensing flow rate is dependent on the final filter pressure drop. Another drawback of the system is that the scaling of the dispensing volumes from drop-by-drop to large flow rates is not perfect.

OBJECT OF THE INVENTION

It is therefore an object of the present invention to provide a water purification and dispensing system and method comprising a closed water circulation loop and improved with respect to the dispensing characteristics i.e. the range of dispensing volume and the accuracy of dispensing of a particular volume.

SOLUTION

To solve this problem the invention provides a water purification and dispensing system with the features of claim 1 and a water purification and dispensing method using the system and including the features of claim 13. Preferred embodiments of the system are defined in the dependent claims. The invention thus provides a water purification and dispensing system comprising a (closed) water recirculation loop including a water inlet for introducing water to be purified, pumping means for pumping water through said water recirculation loop in a flow direction, water purification means for purifying water downstream of said water inlet, a dispensing portion of the water recirculation loop including one or more outlet(s) for purified water branched from said water recirculation loop downstream of said water purification means, a first valve arranged between each outlet and said water recirculation loop, for controlled dispensing of the purified water from said recirculation loop through the respective outlet, a second valve arranged in said dispensing portion of the water recirculation loop downstream of said first valve(s) and upstream of said pumping means, a bypass passage branched from said water recirculation loop and bypassing said dispensing portion of the water recirculation loop including said first valve(s) and said second valve, and a third valve for controlling the flow rate through said bypass passage.

The system of the invention is suitable to be operated with high accuracy in all necessary operating modes including a recirculation mode, a manual dispensing mode and an automatic or volumetric dispensing mode in which a predefined volume is dispensed.

In the system of the invention, due to the provision of the bypass passage branched from the water recirculation loop and bypassing the dispensing portion of the water recirculation loop including the first valve(s) and the second valve, and of the third valve for controlling the flow rate through the bypass passage, the pumping means on the loop can be operated in a constant mode with constant flow rate independent from whether the system is operated in anyone of the above modes. This provides a user the possibility of dispensing the purified water at progressively increased flow rates from drop-by-drop up to full rate with high accuracy and quick response.

Since the water can be circulated with a substantially constant flow rate through the system not only during recirculation mode but also during any dispensing mode, a constant flow rate can be maintained inter alia through a final purification stage of an ultrapure water purification means which is frequently identified as "polishing stage" and typically includes a mixed bed of ion exchange resin, for which a constant flow rate through the ion exchange bed is a key parameter to achieve optimal polishing and to maintain a constant quality of water.

The invention is particularly advantageous in solving recent needs for specific ultra-pure water, which means processed water from which specific contaminants have been removed to address requirements in particular fields of application. Such water, for example, comprises bacteria free water, endotoxin free water, volatile organic free water, endocrine disruptor free water, dedicated water for low pressure chromatography etc. Many of these applications involve a maximum dispensing flow rate of 2 to 3 litres per minute down to very small dispensing rates like drop-by-drop dispensing. The typical pressure drop for the filters involved in the purification means of such systems to produce the dedicated purified water may range from 0.5 bar to 4 bar at 2 litre per minute. Therefore, in a dispensing mode, the minimal internal pressure in the loop will vary from 0.5 to 4 bar. The prior art solution of using a preloaded check valve in the return loop as a means to generate the backpressure during dispensing is not preferable as the valve would be loaded at a too high pressure to accommodate in the worst case and it would generate a too high pressure drop and internal pressure during recirculation. Furthermore, preloaded valves are loaded with the spring that normally add +/−15% variance that must be accounted for and reduces the accuracy of dispensing of a particular volume.

Preferably, the system further comprises a fourth valve for controlling the flow rate into the dispensing portion of the water recirculation loop including the first valve(s) and the second valve.

Preferably, the third valve and the fourth valve are arranged to respectively control the flow rate through the bypass passage and the flow rate into the dispensing portion of the water recirculation loop in plural predefined steps.

Preferably, the third valve and the fourth valve are integrated in the form of a three-way valve arranged to simultaneously control the flow rate through the bypass passage and the flow rate into the dispensing portion of the water recirculation loop.

Preferably, the three-way valve is arranged to control the flow rates in opposite directions.

Preferably, the three-way valve is a motorized valve.

Preferably, the system further comprises a control unit for controlling the first valve(s), the second valve, the third valve, and the pumping means, and, if provided, the fourth valve.

Preferably, the control unit is arranged to perform:

a recirculation mode in which the first valve(s) is/are maintained closed, the second valve is maintained opened, the third valve is operated to substantially prevent the flow through the bypass passage, the fourth valve is operated to allow flow into the dispensing portion of the water recirculation loop, and the pumping means is operated; and/or a manual dispensing mode in which the first valve(s) is/are selectively opened in response to a user operation, the second valve is maintained closed, the third and fourth valves are operated to allow at least some flow into the dispensing portion of the water recirculation loop, and the pumping means is operated; and/or an automatic dispensing mode in which the first valve(s) is/are selectively opened until a predetermined volume of the water is dispensed from the respective outlet, the second valve is maintained closed, the third and fourth valves are operated to allow at least some flow into the dispensing portion of the water recirculation loop, and the pumping means is operated.

Preferably, a flow meter is located on the dispensing portion of the recirculation loop upstream of each first valve for measuring the flow rate into the respective first valve.

Preferably, the control unit is arranged to perform the automatic dispensing mode, is arranged to open the first valve of the respective outlet in response to a user operation, is arranged to monitor the flow rate measured by the flow meter after the opening of the first valve, and is arranged to close the first valve after it is determined based on the monitored flow rate, that the predetermined volume of water has been dispensed from the associated outlet.

Preferably, the control unit is arranged to perform the automatic dispensing mode, is arranged to open the first valve of the respective outlet in response to a user operation, is arranged to monitor the time after the opening of the first valve, and is arranged to close the first valve after it is determined based on the monitored time, that the predetermined volume of water has been dispensed from the associated outlet.

Preferably, the control unit is arranged to operate the third and the fourth valve to adjust, to a predetermined value, the pressure of the water in the dispensing portion of the water recirculation loop.

Preferably, the control unit is arranged to operate the pumping means in a substantially constant supply rate in the respective operation modes. Preferably, the first valve(s) and preferably the second valve is/are solenoid valves of the type with a normally closed (NC) flow path.

The invention also concerns a method of operating a water purification and dispensing system according to the invention, comprising:

a recirculation mode in which the first valve(s) is/are maintained closed, the second valve is maintained opened, the third valve is operated to substantially prevent the flow through the bypass passage, the fourth valve is operated to allow flow into the dispensing portion of the water recirculation loop, and the pumping means is operated; and/or a manual dispensing mode in which the first valve(s) is/are selectively opened in response to a user operation, the second valve is maintained closed, the third and fourth valves are operated to allow at least some flow into the dispensing portion of the water recirculation loop, and the pumping means is operated; and/or an automatic dispensing mode in which the first valve(s) is/are selectively opened until a predetermined volume of the water is dispensed from the respective outlet, the second valve is maintained closed, the third and fourth valves are operated to allow at least some flow into the dispensing portion of the water recirculation loop, and the pumping means is operated.

BRIEF DESCRIPTION OF THE DRAWINGS

In the following the invention will be described on the basis of one preferred embodiment using the attached drawing as reference.

DETAILED DESCRIPTION OF THE INVENTION

The system shown in FIG. 2 has already been described in detail in connection with the discussion of the prior art document EP 1814007A1.

Figure 1:
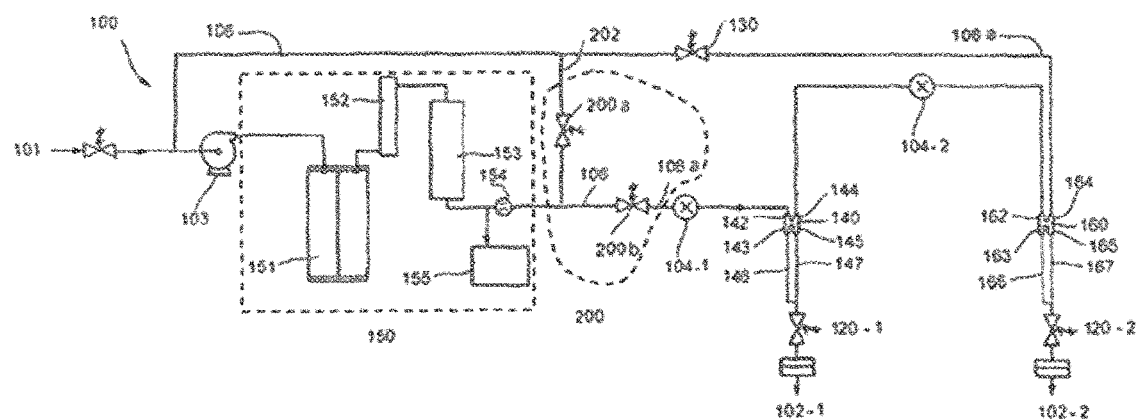
FIG. 1 is a diagram of a preferred embodiment of a water purification and dispensing system according to the invention.
Figure 2:
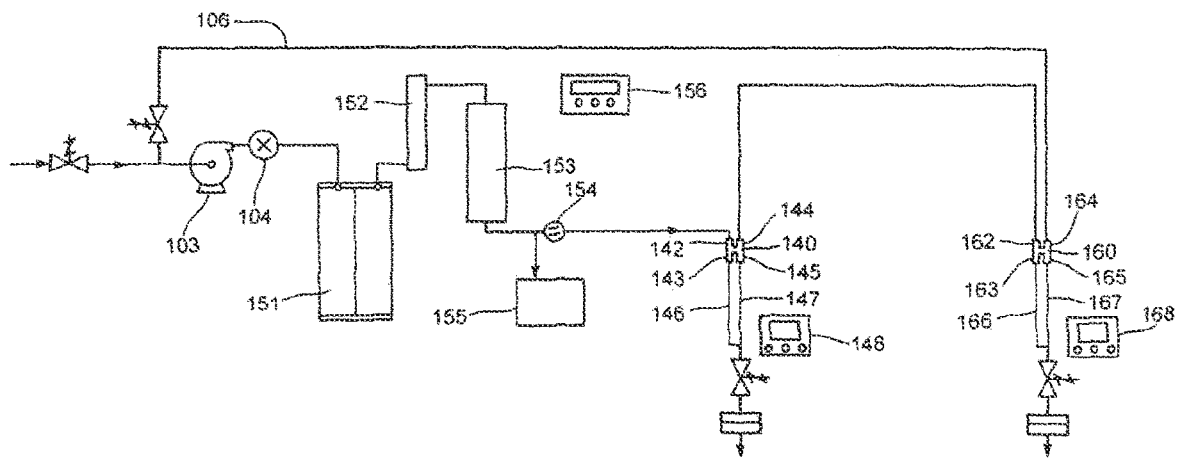
FIG. 2 is a diagram of a water purification and dispensing system disclosed in the prior art.
Figure 3:
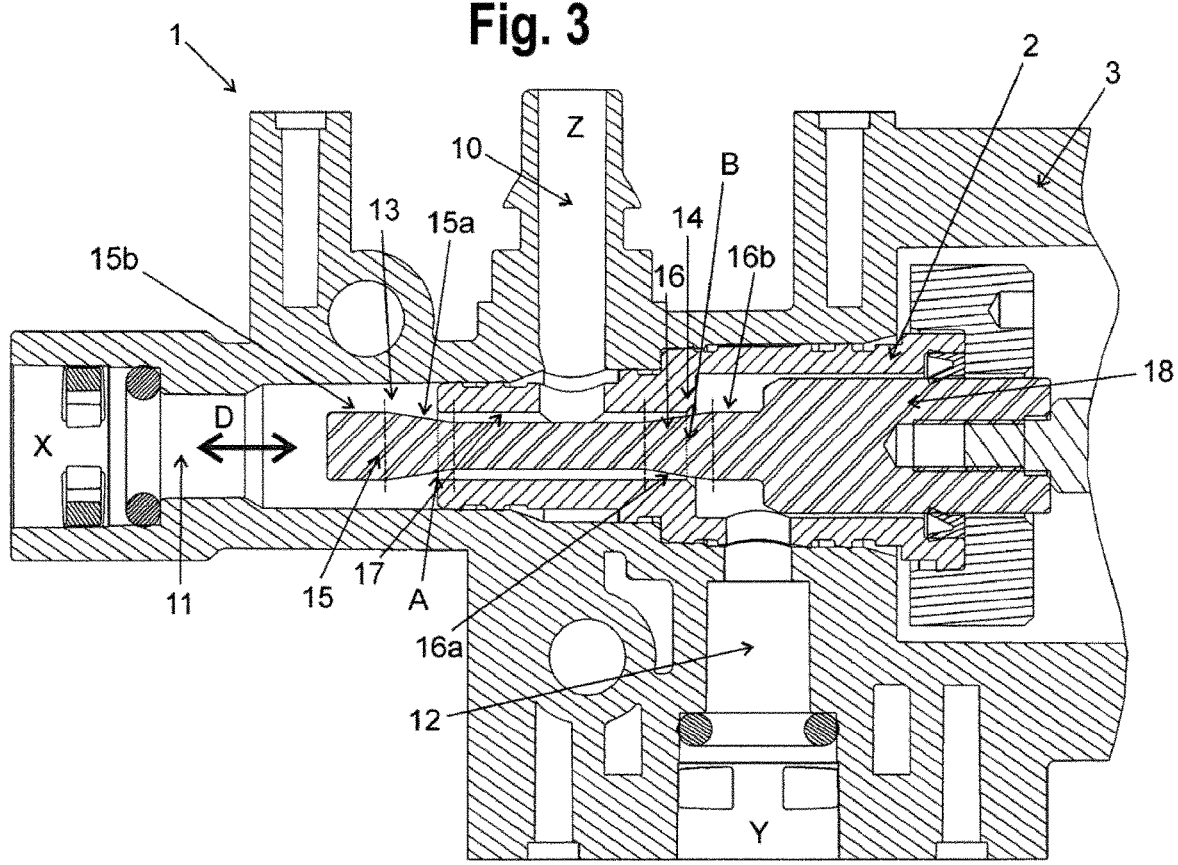
FIG. 3 shows a fluid distributor valve according to the invention in a cross sectional view.

The water purification and dispensing system 100 of the invention shown in FIG. 1 comprises a closed water recirculation loop 106 which is, in its basic layout and components, similar to the one disclosed in the document EP 1814007A1 shown in FIG. 2.

The system accordingly includes a water inlet 101 for introducing water to be purified into the loop, a pumping means 103, preferably a positive displacement type pump, for pumping water through the water recirculation loop 106, thereby defining a preferred flow direction in the loop, and water purification means 150 for purifying the water downstream of the water inlet 101. The water purification means is shown as a functional block and may include various components, for example including inter alia one or more pre-treatment device(s), UV-lamp(s), mixed bed(s) of ion exchange resins, filter(s) etc.

A dispensing portion 106a of the water recirculation loop includes one or more outlet(s) 102 for purified water which are respectively branched off from the water recirculation loop 106 (i.e. from the dispensing portion 106a thereof) downstream of the water purification means 150 and, for each of the outlets, a first valve 120 is arranged between each outlet 102 and the water recirculation loop 106 for controlled dispensing of the purified water from the recirculation loop 106 through the respective outlet 102 by operating the respective valve 120.

A second valve 130 is arranged in the dispensing portion 106a of the water recirculation loop 106 downstream of the one or more first valves 120, i.e. downstream of the last outlet 102, and upstream of the pumping means 103.

The structure of the outlets 102 can be preferably similar to the one disclosed in the document EP 1814007A1 and may accordingly include a H-manifold that allows the dispensing point to be attached to the dispensing portion 106a of the water recirculation loop 106 by means of two pipes with relatively small cross section and/or little stiffness/large elasticity to allow the dispensing point to be located in a hand-held device or mobile dispensing unit to be easily manipulated by a user to perform the dispensing tasks and to bring the actual outlet opening more easily to a desired location. The mobile dispensing unit may include the respective second valve 120 to be described later. A point-of-use dispensing system can be made up with two subassemblies including a base unit and a handheld device or dispenser handset, i.e. the mobile dispensing unit. The handheld device is connected to the base unit by the two small diameter pipes. The dispensing portion 106a of the recirculation loop 106 is connected to the base unit via an associated flow meter to be described later and the H-manifold, both located in the base unit. In the dispensing mode the two small diameter pipes are working as two pipes in parallel, thus having a small pressure drop, whereas in recirculation mode, the water is recirculated via these two pipes in series. The disclosure of the document EP 1814007 A1 is introduced herein by reference with respect to the structure of the dispensing unit and the use and function of the H-manifold. The first valve(s) 120 and preferably the second valve 130 is/are solenoid valves of the type with a normally closed (NC) flowpath.

The system of the invention thus differs from the one disclosed in EP 1814007A1 inter alia by the provision of a bypass passage 202 branched from the water recirculation loop 106 and bypassing the dispensing portion 106a of the water recirculation loop 106 including the first valve(s) 120 and the second valve 130. The bypass passage also includes a third valve 200a for controlling the flow rate through the bypass passage 202. Preferably the system also includes a fourth valve 200b for controlling the flow rate into the dispensing portion 106a of the water recirculation loop. The third valve 200a, and, if provided, the fourth valve 200b are arranged to respectively control the flow rate through the bypass passage 202 and the flow rate into the dispensing portion 106a of the water recirculation loop in plural predefined steps or continuously. Preferably, the third valve 200a and the fourth valve 200b are integrated in the form of a three-way valve 200 arranged to simultaneously control the flow rate through the bypass passage 202 and the flow rate into the dispensing portion 106a of the water recirculation loop. Preferably the third and fourth valves are provided, either as separate valves or in the form of the integrated three-way valve such that they are arranged to simultaneously control the flow rates in opposite directions by a single activation, i.e. if the flow rate through the one valve is increased while the flow rate through the other valve is decreased, preferably in corresponding amounts. The three-way valve of such structure is preferably motorized to allow a precise setting and a remote operation by a controller.

In other words, in the most general aspect the incoming stream of the recirculation loop 106 downstream of the water purification means is split into two streams, one through the bypass passage 202 and one through the dispensing portion 106a, and the split ratio can be selectively set by the third and fourth valves (or the integrated three-way valve).

The system comprises a control unit for controlling the first valve(s) 120, the second valve 130, the third valve 200a and the pumping means 103, and, if provided, the fourth valve 200b (the latter preferably in the form of the single three-way valve). The control unit is arranged to perform the following control settings based on predefined programming.

In a recirculation mode the first valve(s) 120 is/are maintained closed, the second valve 130 is opened, the third valve 200a is operated to substantially or completely prevent the flow through the bypass passage 202, the fourth valve 200b is operated to allow flow into the dispensing portion 106a of the recirculation loop, and the pumping means 103 is operated at a constant, preferably the rated maximum flow rate to effect recirculation and avoid stagnation points in the system.

In a manual dispensing mode the first valve(s) 120 is/are selectively opened in response to a user operation, the second valve 130 is generally maintained closed, the third and fourth valves 200a, 200b are operated to allow at least some flow into the dispensing portion 106a of the water recirculation loop and to adjust the dispensing flow rate, and the pumping means 103 is operated, again preferably at a constant flow rate and preferably again at the maximum rated flow rate. In this mode the incoming stream is divided into two streams, the one that goes into the dispensing portion 106a and to the one or more outlets and the one that is recirculated through the bypass passage 202 more directly to the pump and the purification means. In the manual dispensing mode the system allows the user to dispense the purified water at any flow rate from drop-by-drop up to the full dispensing volume. The setting of the desired dispensing flow rate should preferably be linear and continuous but can be in predefined steps or progressive/degressive. The dispensing flow rate is set by appropriately setting the respective first valve(s) 120 and these valves are designed for this purpose.

Since the second valve 130 is a normally closed solenoid valve that is actuated during recirculation mode, the valve does not generate any pressure during recirculation. Since the second valve 130 is maintained closed during the dispensing modes, the pressure in the loop is mainly depending on the final filter of the purification means and the dispensing flow rate. Due to this configuration the purification loop is not pressurized when the system is at a standstill.

With this configuration the setting of the progressive dispensing from drop-by-drop to a full dispensing flow throughput is not dependent on the modulation of the operation of the motor pump but the pump can be operated at a constant, preferably the maximum rated throughput. The third and fourth valves 200a, 200b, preferably in the form of the motorized three-way valve, provide the pressure drop dynamic to ensure that the dispensing flow rate can be adjusted from drop-by-drop to full throughput and this is true whatever the pressure drop of the final filter of the purification means is. The throughput of the pumping means can be set at substantially the same value in all dispensing modes and in the recirculation mode in the preferred embodiment.

Preferably the dispensing portion 106a of the water recirculation loop 106 includes more than one, preferably up to three or even more different dispensing points in the form of the outlets 102 respectively provided with one first valve 120. Since the first valves can be individually operated, the system allows simultaneous dispensing in different modes at the various dispensing sites. Since the pumping means is operating at or nearly at rated pumping volume, the dispensing volume at one outlet is essentially independent from that at another outlet. If necessary, the third and fourth valves 200a, 200b can be adjusted to direct a larger flow volume into the dispensing portion 106a of the water recirculation loop if larger dispensing volumes at plural outlets are desired. If the system setting is such that the progressive and full dispensing volume at plural outlets is not possible due to limitations of the piping, of the pumping means etc., then the control unit can be programmed to deactivate the progressive dispensing and to allow only the manual dispensing or a limited dispensing volume at the respective outlets. In this case the maximum flow rate per outlet will be the maximum flow rate of the pump divided by the number of outlets that are opened or active.

The dispenser handset may include only the dispensing solenoid valve (first valve) 120 and the necessary electronics to control the valve. The third and fourth valves 200a, 200b (the motorized three-way valve 200) is preferably integrated in a system casing where the purification means and the pumping means are provided, too.

A further mode available in the system and the control unit is an automatic dispensing mode in which the first valve(s) 120 is/are selectively opened (in response to a user operation) until a predetermined or preset volume of the purified water is dispensed from the respective outlet 102, the second valve 130 is maintained closed, the third and fourth valves 200a, 200b are operated to allow at least some flow into the dispensing portion 106a of the water recirculation loop, and the pumping means 103 is operated, again preferably at the rated maximum pumping rate.

For this mode a flow meter 104-1, 104-2 is preferably located on the dispensing portion 106a of the recirculation loop 106 upstream of each first valve 120 for measuring the flow rate into the respective first valve 120. For the dispensing mode the control unit is arranged to open the first valve 120 of the respective outlet 102 in response to the user operation, to monitor the flow rate measured by the flow meter 104-1, 104-2 after the opening of the first valve 120, and to close the first valve 120 after it is determined based on the monitored flow rate, that the predetermined volume of purified water has been dispensed from the associated outlet 102.

In an alternative operating pattern of the automatic dispensing mode the control unit is arranged to open the first valve 120 of the respective outlet 102 in response to the user operation, to monitor the time lapsed after the opening of the first valve 120, and to close the first valve 120 after it is determined based on the monitored lapsed time and under consideration of the flow rate, that the predetermined volume of water has been dispensed from the associated outlet 102.

As mentioned above the respective flow meters are integrated in the base unit and thus still relatively close to the handheld unit so as to minimize variations of computed water volume if the flow meter were located at a more distant location in the recirculation loop due to piping deformation because of water temperature changes and/or loop internal pressure variations. It also reduces the time lag and improves the accuracy of the setting of the dispensed volume. In case an automated first valve 120 is used that has plural or indefinite settings for the throughput, the dispensing flow rate can be automatically slowed down when a set volume is nearly reached, thereby minimizing the response time effect or delay of the control board when closing the dispensing valve is required after the set volume is detected.

If automatic dispensing is required at plural consecutive outlets, the flow rate of outlet number 2 can be computed by means of flow meter 104-2 and the flow rate of outlet number 1 can be computed by flow meter 104-2 and 104-1 according to the formula:

Flowrate at outlet number 1=flowrate 104-1−flowrate 104-2.

The control unit also can be arranged to operate the third and the fourth valve 200a, 200b (the three-way valve 200) to adjust the pressure of the water in the dispensing portion 106a of the water recirculation loop to a predetermined value necessary to effect the respective operation and dispensing modes.

An embodiment of a fluid distributor valve of the invention which integrates the functions of the above described third valve 200a and the fourth valve 200b in the form of the three-way valve 200 arranged to simultaneously control the flow rate through the bypass passage 202 and the flow rate into the dispensing portion 106a of the water recirculation loop and which is particularly advantageous in the water purification and dispensing system of the invention described above as it provides the function of repartitioning an inlet stream into two outlet streams and allows for a precise setting of a distribution ratio between the outlet streams from a drop-by-drop rate to a full dispensing rate is described below in detail in connection with FIGS. 3 to 9.

Figure 8:
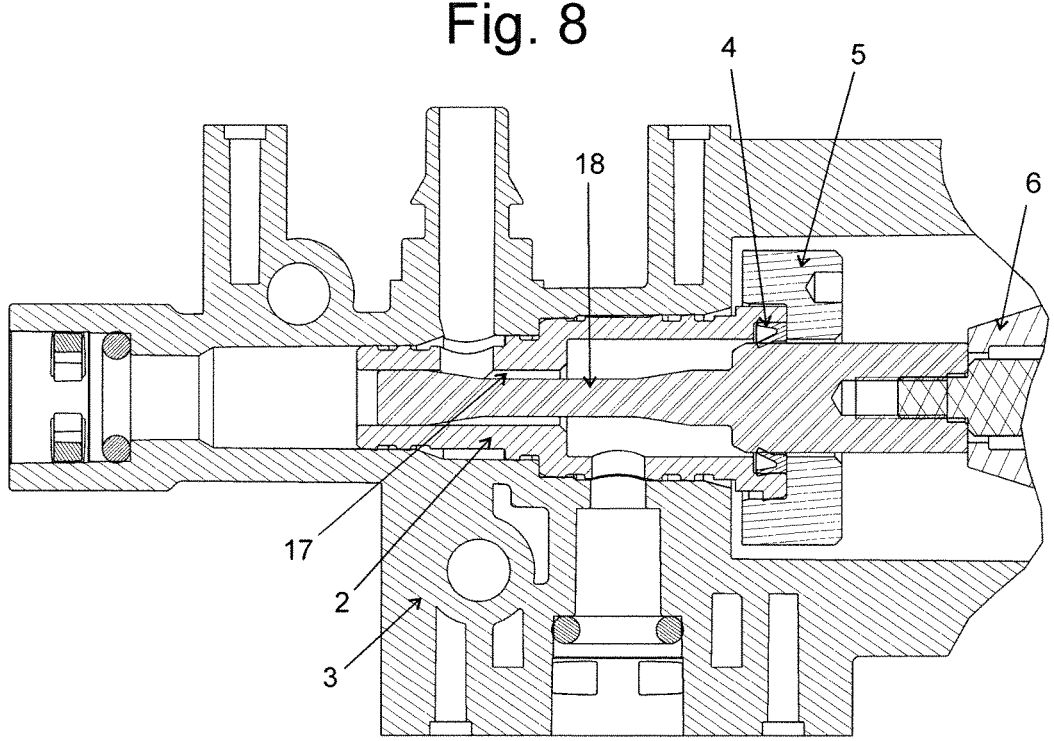
FIG. 8 shows the fluid distributor valve of the invention in the larger context including a drive actuator.
Figure 9:
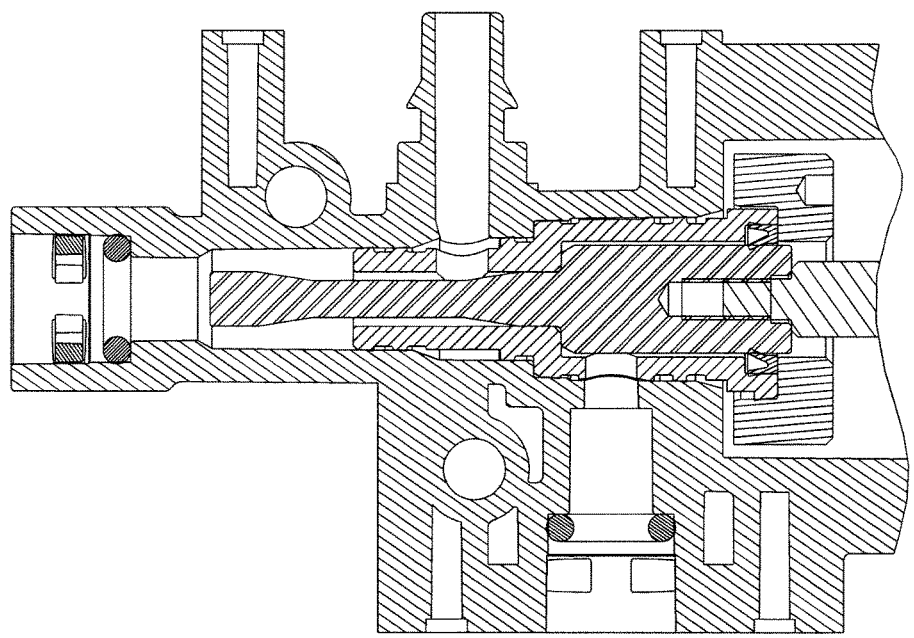
FIG. 9 shows the fluid distributor valve of the invention with the valve body in a dead stop position (left).

The fluid distributor valve 1 of the present invention according to one exemplary embodiment is shown in FIGS. 3, 5, 8 and 9 (in FIG. 8 with an attached drive actuator 6). The fluid distributor valve is for repartitioning or distributing an inlet fluid stream Z into two outlet fluid streams X,Y. The fluid distributor valve 1 (in the following only "valve") comprises an inlet port 10 for the inlet fluid stream Z and two outlet ports 11,12 for the outlet fluid streams X,Y. The entire flow rate of the inlet fluid stream Z is divided and repartitioned by the valve into the two outlet fluid streams X,Y and the flow rate distribution between these two outlet fluid streams is dynamically controlled by first and second valve mechanisms 13,14, one arranged upstream each outlet port.

The valve mechanisms are configured such that the flow rate of the fluid stream X at one outlet port is in the range of 0.1 to 99.9% of the inlet fluid stream Z and the flow rate of the fluid stream of the fluid stream Y at the second outlet port is accordingly Y=100%−X % of the inlet stream Z. Each valve mechanism 13,14 comprises a valve body 15,16 slidable in a cylindrical valve bore 17 in reciprocating strokes along a direction D caused by moving a valve shaft 18 connected to the valve bodies by operating the motorized drive actuator 6 or by manual operation. In the embodiment used to describe the invention the valve bore 17 is a continuous valve bore that is the same for both valve mechanisms. Each of the valve bodies 15,16, which in this embodiment are arranged on a common valve shaft 18 arranged to be lineally movable in the stroke direction D by operation of the motorized drive actuator 6, includes a first portion 15a,16a that is formed with a progressively changing diameter so as to reduce a valve gap that exists between the valve bore inner peripheral wall and the valve body outer peripheral wall at a plane A,B perpendicular to the stroke direction when the valve is operated in a regular operating range of the valve mechanisms, from a maximum valve gap to a minimum valve gap to thereby reduce or increase the flow rate towards the associated outlet port upon the relative movement.

The gap accordingly is the free cross section at the respective plane A,B that is the results from the inner diameter (cross section) of the valve bore 17 at the plane A,B minus the diameter (cross section) of the valve body located at the plane in the respective position of the valve body/valve shaft. When the valve shaft is sliding in the direction D along its longitudinal axis and assuming that the cross section of the valve bore 17 is constant, the free cross section at the respective planes A,B is changing depending on the change of diameter (cross section) of the valve bodies.

In the preferred embodiment the first portions 15a,16a of the valve bodies of the two valve mechanisms are arranged such that their respective diameters change in opposite sense along the stroke direction so that an increase of the flow rate at one of the outlets at the same time leads to a reduction of the flow rate at the other outlet, wherein the sum of the flow rates necessarily is the same and corresponds to the inlet flow rate. In a preferred embodiment the valve bodies are formed such that the sum of the cross sections at the planes A,B perpendicular to the stroke direction of the first portions of the two valve mechanisms is substantially constant at each valve shaft position in the regular operating range. However, depending on the application, the cross section evolution of the valve bodies can be non-linear with the valve shaft stroke thereby leading to a progressive distribution of the flow rate between the outlet ports. In general, the evolution and absolute value of the cross section of the valve bore at the planes A,B and of the first portions of the valve bodies related to the stroke length define a particular setup of the hydraulic fluid distribution including pressure drop and flow rates at each respective valve position within the regular operating range.

The flow rate repartitioning between the outlet ports theoretically works perfectly from 0 to 100% of the inlet flow rate on each port if the cross section at the planes A,B can be reduced to zero. Practically, however, it is very difficult to reduce the cross section to zero due to production tolerances on the valve bore and the valve bodies and dimensional changes in operation due to temperature influences and/or wear. While it would be possible to provide a dead stop engagement or sealing contact between the valve body and the valve bore at each respective end position in the regular operating range as in the prior art, such dead stop is not preferable as mentioned above due to the initial breaking delay and momentum required to move the respective valve mechanisms from such dead stop position, and due to the difficulty of knowing exactly the position of a drive actuator, thus hindering the precise distribution and repartitioning of fluid towards the ends of the regular operating range where very small volumes of fluid should be dispensed from a respective outlet. Further, a reduction of the cross section down to a substantially complete closure of the gap at the end position of the stroke in the regular operating range leads to the risk of wedging the valve body in the valve bore when surfaces get in contact.

It would accordingly be necessary to reduce the gap between the valve body and the valve bore to below 0.01 mm but this is not only costly but also difficult to maintain in actual operation due to various influences. The invention accordingly provides that at least one of the valve bodies 15,16 of the valve mechanisms 13,14, preferably both, is/are formed such that the minimum valve gap at the end position of the stroke of the valve body in the regular operating range is substantially maintained constant in a certain zone over an axial length in the vicinity of the end position of the stroke in the regular operating range. This can be achieved in that the at least one valve body, preferable both, have a second portion 15b, adjacent to the first portion 15a, that is formed with the progressively changing diameter, which second portion 15b, retains the maximum diameter of the first portion 15a defining the minimum valve gap over a defined length in the stroke direction before the end position of the stroke of the valve body in the regular operating range is reached. The length of the second portion 15b, which can be called a "capillary area" of the valve mechanism, is preferably between is 1 to 5 mm but depends on the particular pressure of the inlet fluid stream. The higher the pressure, the longer the capillary area in order to still substantially block the fluid flow at the respective outlet at the end position of the stroke of the valve body without bringing the surfaces of the valve body and the valve bore into contact with each other.

Figure 4:
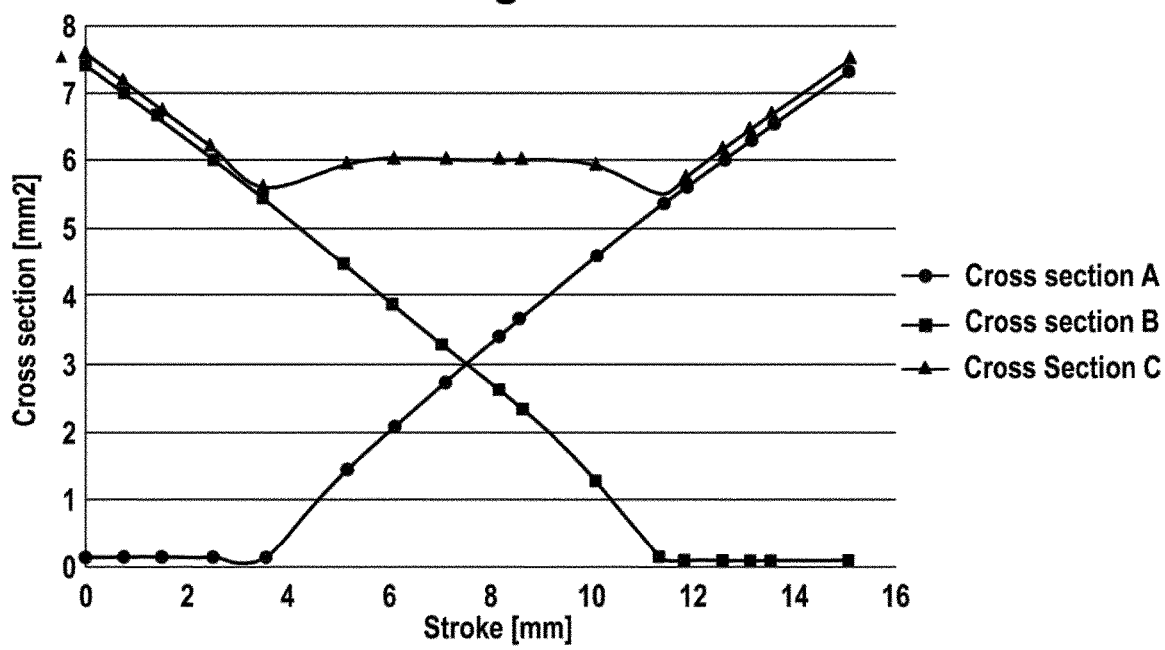
FIG. 4 shows a diagram indicating a cross section variation at the valve mechanisms in relation to a stroke length of a valve shaft.

With the provision of this capillary area the pressure drop at the outlet fluid stream can be increased without further cross section reduction simply by extending the length of the capillary area maintaining a substantially constant cross section over a certain axial length of the valve body stroke. Theoretically, the flow rate can be reduced to zero with an infinite length but the length in practice is tuned with the minimal flow rate target, the pressure at the valve inlet and the available stroke length. FIG. 4 shows an example diagram indicating the cross section variation related to the stroke length wherein the cross section refers to the free cross section remaining between the valve body and the valve bore in mm2.

The diameter defining the minimum valve gap and the length in the stroke direction of the second portion of the valve body are dimensioned such that the flow rate through the gap in the end position of the stroke of the valve body in the regular operating range is smaller than 1% of the inflow rate, preferably smaller than 0.2% of the inflow rate but preferably larger than 0.1%. The amount of the flow rate, for example for the application in a water purification and dispensing system, should be preferably smaller than 1 l/h at an inflow pressure of 0.1 to 6 bar.

Figure 5A:
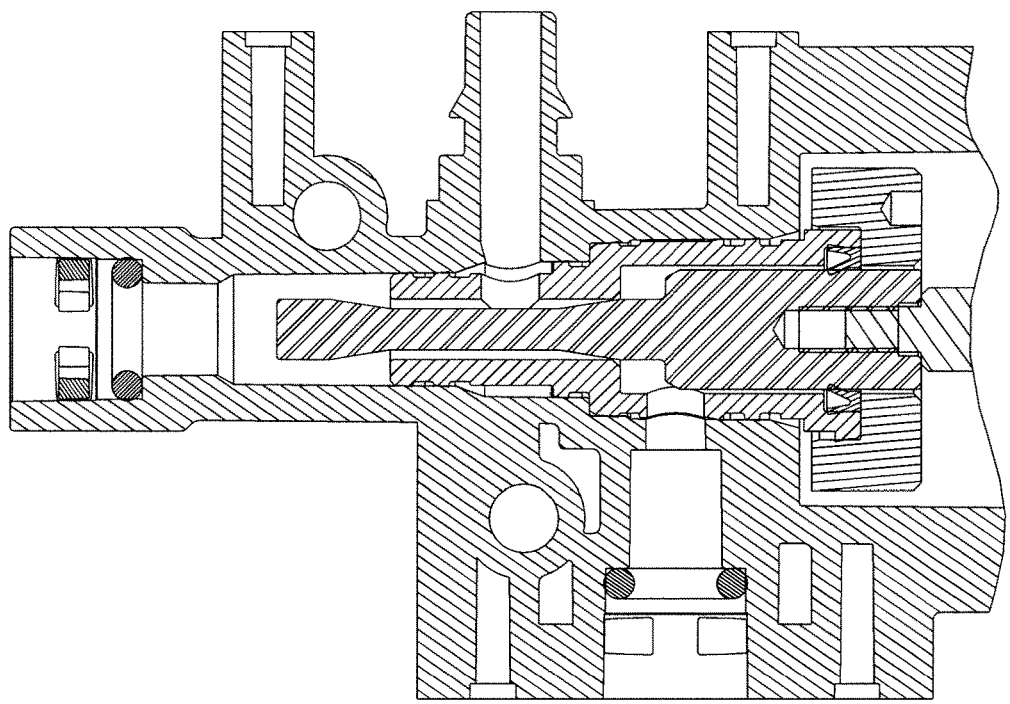
FIGS. 5a to d show various positions of the fluid distributor valve of the invention between extreme left and extreme right positions within the regular operating range.
Figure 5B:
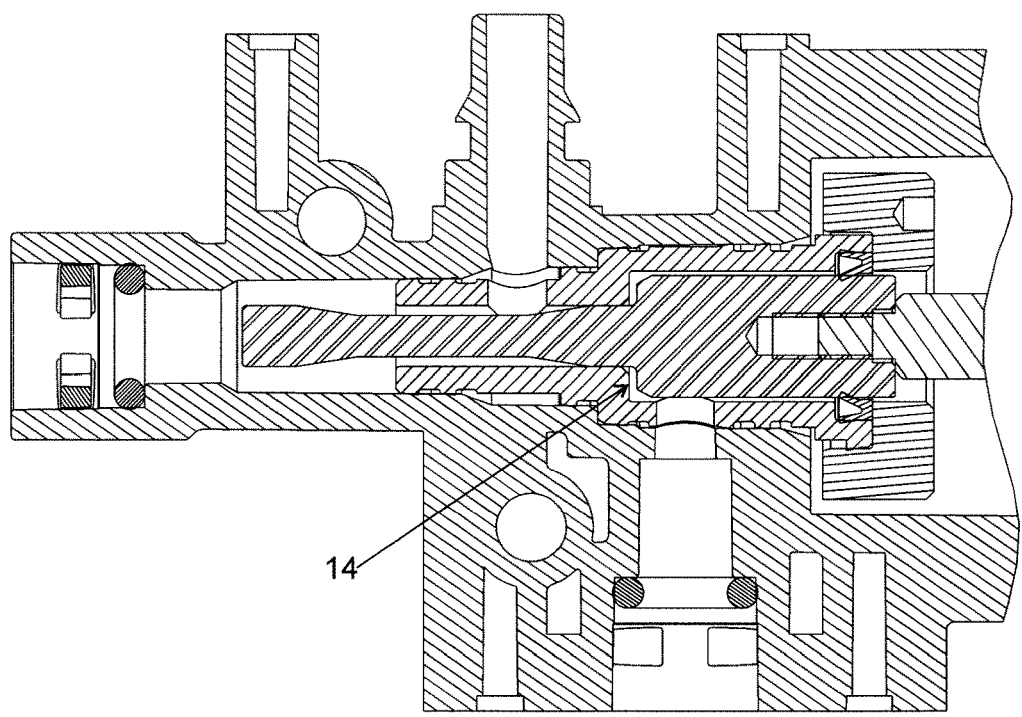
Figure 5C:
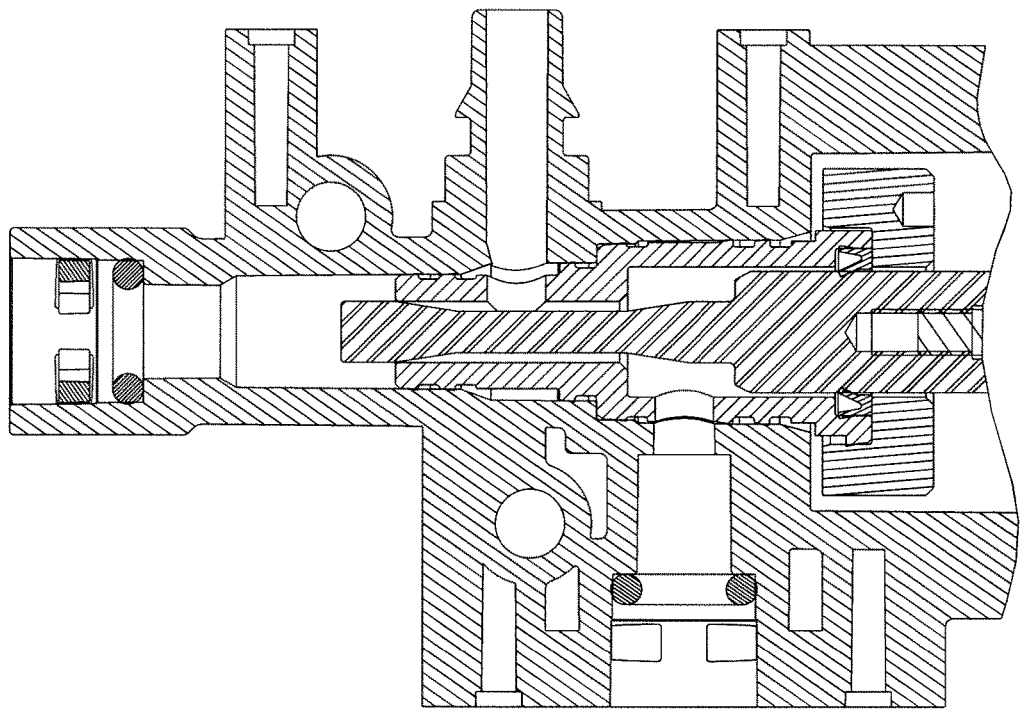
Figure 5D:
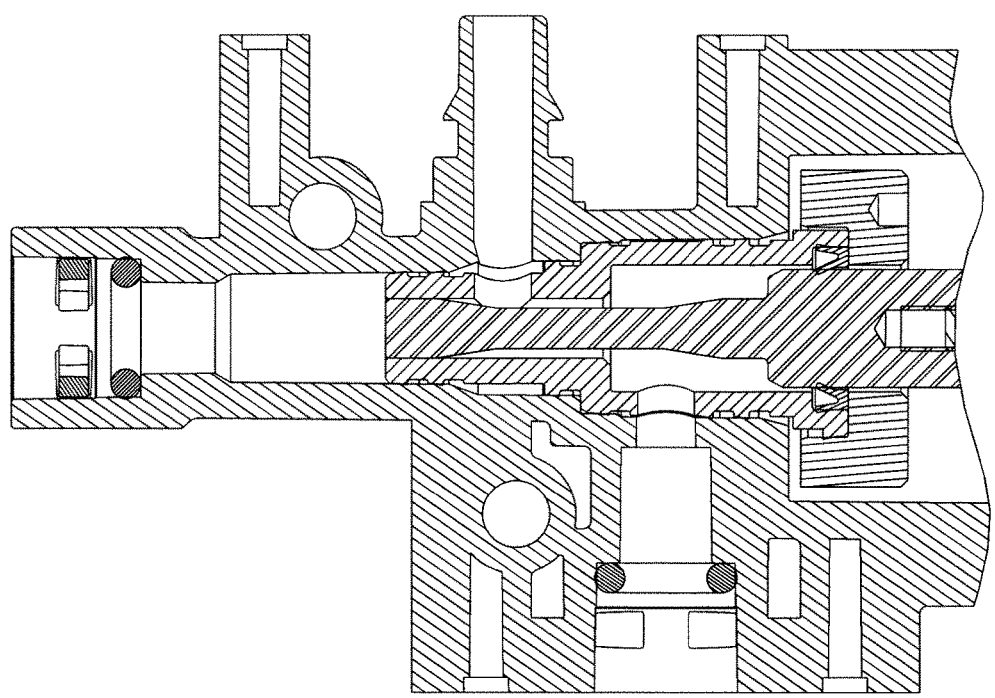
Figure 6:
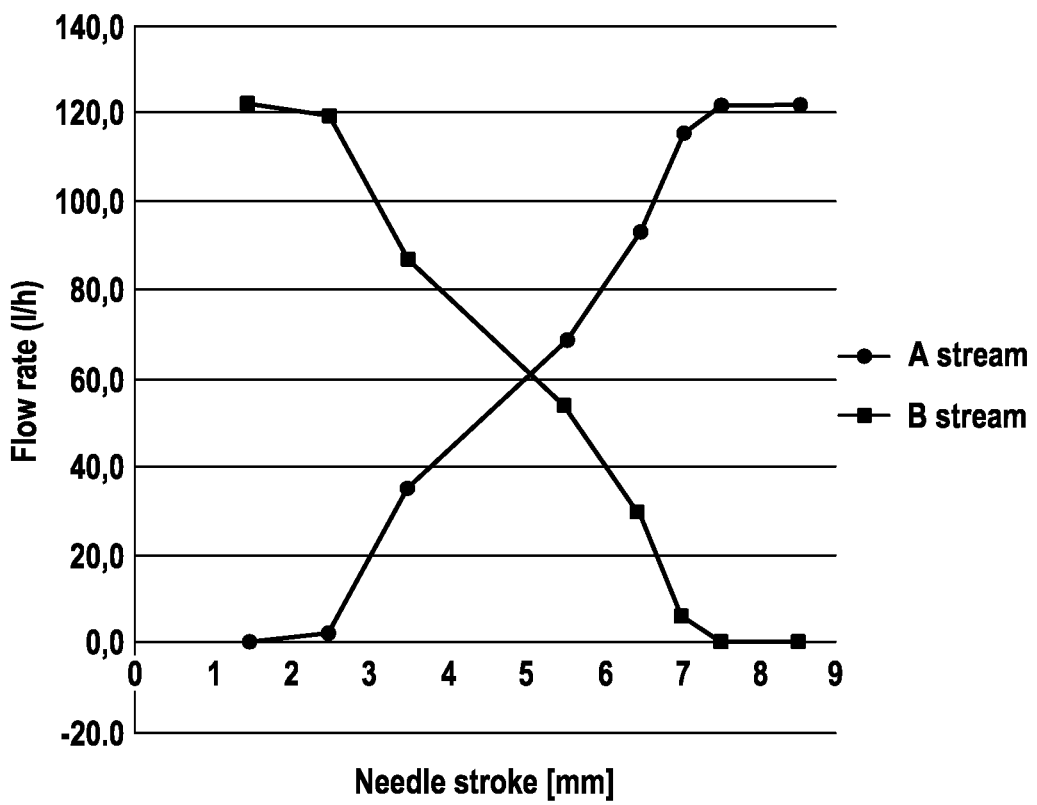
FIG. 6 shows diagram indicating the relation between the flow rate and the stroke length of a valve shaft at an inlet flow rate of 120 l/h and an inlet pressure of 1 bar.
Figure 7:
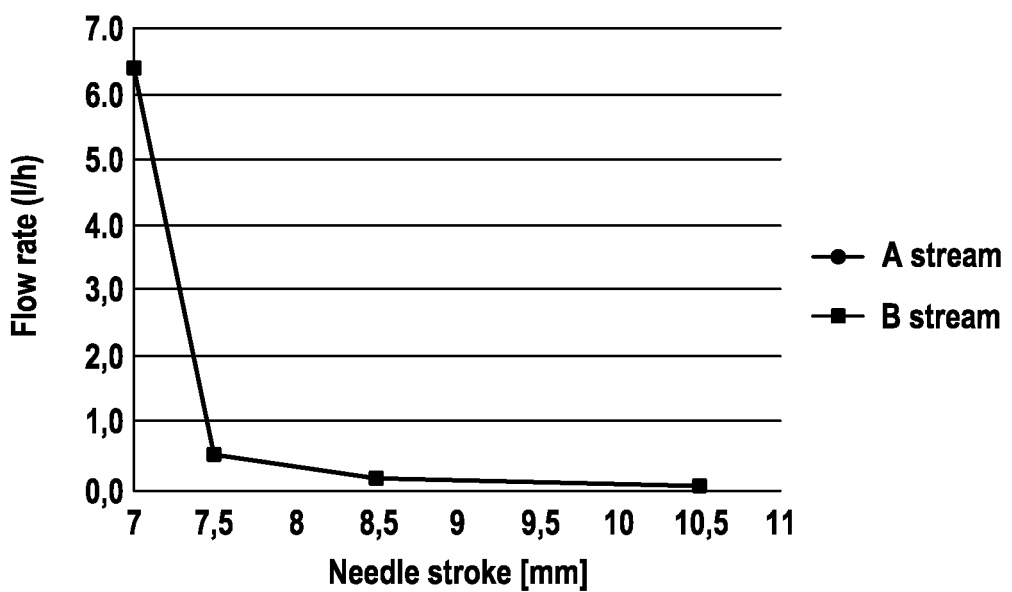
FIG. 7 shows a diagram indicating the relation between the flow rate and the stroke length of FIG. 6 zoomed into the capillary area of the fluid distributor valve.

The FIGS. 5a to 5d show typical positions for the fluid distributor valve of the invention according to the embodiment within the regular operating range of repartitioning on the extreme left position before start of the capillary area (FIG. 5a), on the extreme left position on the capillary area (FIG. 5b), on the extreme right position before start of the capillary area (FIG. 5c) and on the extreme right position on the capillary area (FIG. 5d). The FIG. 6 shows a diagram relating the flow rate in l/h to the stroke of the valve shaft at an inlet flow rate of 120 l/h and an inlet pressure of 1 bar of the preferred embodiment. FIG. 7 shows a zoomed-in diagram relating the flow rate to the stroke of the valve shaft in the capillary area. The cylindrical valve bore 17 is preferable formed in a cartridge 2 which is inserted and fixed in an external housing 3. Thus, the cartridge 2 and the housing 3 can be made from different materials wherein the material for the cartridge is one selected to reach very low tolerances for machining like stainless steel or brass. The housing can be made from a less costly material to implement the hydraulic connection functions of the inlet and outlets, i.e. any desired connectors leading to the inlet and outlet ports. The housing can be even made from suitable plastics material. If cost is not an issue the cartridge and the housing can be made from an integral part of material and machined according to the requirements. The valve shaft 18 that includes, in this embodiment, the valve bodies 15,16 of the two valve mechanisms, is in the form of a valve needle and is connected at an end protruding from the cartridge 2 to a motorized drive actuator 6.

The drive actuator can be a linear motor or a rotary motor coupled with a transmission in the form of a spindle drive converting the rotation to a linear stroke. The valve shaft 18 further can be arranged so as to allow it to be manually driven in the regular operating range, i.e. by providing a portion of the valve shaft or of the actuator axis that is accessible for a user on the outside of the casing where the user can grip and rotate the drive actuator axis or the valve shaft. The fluid-tightness of the cartridge 2 between the valve bore 17 and the valve shaft 18 on the side of the drive actuator is realized with a seal 4 and a flange part 5 attached to the cartridge 2 or (not shown) to the external housing so as to surround the protruding part of the valve shaft 18 (see FIG. 8).

The cartridge 2, in which the valve bore 17 is formed, and the valve shaft 18 are preferably designed to define a position along one or each of the opposite stroke directions where the two components can get in contact. These contact positions are outside the regular operating range of the valve mechanisms and preferably outside the valve bore with a spacing in the stroke direction from at least one or from both of the end positions of the regular operating range and they serve as a defined mechanical stop position. The valve is configured such that the valve shaft can be moved to such a mechanical stop position in a specific drive mode of the drive actuator that is distinct from the drive mode in which the valve is operated in the regular operating range. This mechanical stop position or dead stop position is necessary to initialize the "0" valve position (see FIG. 9) and the drive mode for moving the valve shaft to the stop position is selected and executed whenever it is necessary to initialize the valve drive parameters.

In one variant the linear actuator as an example of a drive actuator is equipped with an encoder for determining the moving position of the drive actuator and the mechanical stop is accordingly arranged to be used for calibrating the drive actuator. In another variant, for example where a step motor is used as the drive actuator, be it in the form of the linear motor or a rotary motor, the mechanical stop position is used to reset a counter and the steps of the step motor from the mechanical stop are subsequently counted to estimate the valve shaft position. Whenever needed the valve shaft can be moved to the mechanical stop position beyond the regular operating range by initiating and executing the specific drive mode in order to reset or recalibrate the drive actuator. Since the mechanical stop position for calibrating the drive actuator is outside the end positions of the regular operating range of the valve mechanisms, the contact of the valve shaft with the mechanical stop position does not lead to the braking or wedging issues at the flow rate repartitioning end positions and has accordingly no influence on the operation of the valve mechanisms.

If the valve shaft position is not read with an encoder but deducted or calculated, a gap 14 between the mechanical stop position and the maximum normal use end position should be implemented to avoid undesired collision with the dead stop. This gap should be implemented regarding the global tolerance of the system and the accuracy of the counting algorithm and could be, for example, 1 mm (see FIG. 5b).

On the other side a further mechanical stop position or dead stop may be provided to control a maximum valve shaft position beyond the regular operating range to the right, for example to avoid a leak risk when the valve is inoperative. This dead stop position, too, can be designed to be reached by the valve shaft only in case of a defect of the valve or prolonged periods of none-use or transport and a specific drive mode can be implemented for the drive actuator that will move the valve shaft to this dead stop position if executed. Again, a gap between the dead stop position and the maximum normal use end position can be implemented to avoid undesirable collision with the dead stop during regular operation. This gap should be implemented regarding the global tolerance of the system and the accuracy of the counting algorithm and it could be, for example, 1 mm.

The drive actuator accordingly has various operating modes, one where the valve shaft is driven in the regular operating range between the extreme left position of the valve shaft where the valve body of the right valve mechanism is located in the capillary area (see FIG. 5b) and the one where the valve body of the left valve mechanism is located in the capillary area (see FIG. 5d). The other drive modes that allow the valve shaft to be moved to the dead stop positions at right or left beyond the regular operating range must be initiated intentionally if, as described, a calibration of the drive actuator is desired or a complete closure of the valve for storage or transport or other purposes is desired.

The drive actuator can be configured to drive the valve shaft in the whole stroke length of the regular operating range where the repartitioning is made in a continuous movement or in a number of distinct pre-set steps and intermediate positions. Such moving behaviour can also be implemented in different drive modes of the drive actuator for the operation of the valve in the regular operating range.

While the preferred embodiment of the fluid distributor valve has the first and second valve bodies of the first and second valve mechanisms arranged on a common valve shaft in a linear arrangement in the continuous cylindrical valve bore and the inlet into the cylindrical valve bore is perpendicular to the stroke direction whereas the outlets from the valve bore communicating with the outlet ports are aligned in the stroke direction, a parallel arrangement would be feasible where the inlet is leading to a common inlet chamber from which valve bores of the respective valve mechanisms lead in parallel or in radial arrangement other than the aligned arrangement in the preferred embodiment.

The valve of the invention provides precise flow repartitioning of an inlet fluid stream towards two outlets from a drop-by-drop flow rate to a maximum flow rate. The valve moreover is cost effective because all product complexity is embedded essentially in only two elements, the cartridge 2 (where the cylindrical valve bore is formed) and the valve shaft 18 (including the valve bodies). In effect manufacturing precision even can be limited to the valve bodies since the minimum gap between the valve bore and the valve bodies is maintained even in the end positions of the regular operating range.

The fluid distributor valve of the invention is particularly suitable for use in the water purification and dispensing system of this invention where the fluid distributor valve 1 described above can be implemented as the 3-way motorized valve 200 in an arrangement where the first outlet 11 is connected to the dispensing portion 106 of the recirculation loop 106 and the second outlet 12 is connected to the bypass passage 202 whereas the inlet 10 is connected to the motor recirculation loop 106. This arrangement is advantageous since the first outlet is located at a higher position than the second outlet and the latter could gather some sealing particulates due to sealing wear during valve operation.

The invention claimed is:

1. A water purification and dispensing system comprising a water recirculation loop including
   a water inlet for introducing water to be purified;
   a pump for pumping water through said water recirculation loop in a flow direction;
   a water purifier for purifying water downstream of said water inlet;
   a dispensing portion of the water recirculation loop including one or more outlet(s) for purified water branched from said water recirculation loop downstream of said water purifier;
   a first valve arranged between each outlet and said water recirculation loop, for controlled dispensing of the purified water from said recirculation loop through the respective outlet;
   a second valve arranged in said dispensing portion of the water recirculation loop downstream of said first valve(s) and upstream of said pump;
   a bypass passage branched from said water recirculation loop and bypassing said dispensing portion of the water recirculation loop including said first valve(s) and said second valve,
   a third valve for controlling the flow rate through said bypass passage; and
   a fourth valve for controlling the flow rate into said dispensing portion of the water recirculation loop including said first valve(s) and said second valve;
   wherein said third valve and said fourth valve are integrated in the form of a three-way valve arranged to simultaneously control the flow rate through said bypass passage and the flow rate into said dispensing portion of the water recirculation loop.

2. The system according to claim 1, wherein said integrated three-way valve is arranged to simultaneously control the flow rate through said bypass passage and the flow rate into said dispensing portion of the water recirculation loop.

3. The system according to claim 1, wherein said three-way valve is arranged to control the flow rates in opposite directions.

4. The system according to claim 1, wherein said three-way valve is a motorized valve.

5. The system according to claim 1, further comprising a control unit for controlling the first valve(s), the second valve, the pump and the integrated three-way valve.

6. The system according to claim 5, wherein said control unit is arranged to perform:
   a recirculation mode in which the first valve(s) is/are maintained closed, the second valve is maintained opened, the third valve is operated to substantially prevent the flow through the bypass passage, the fourth valve is operated to allow flow into the dispensing portion of the water recirculation loop, and the pump is operated; and/or
   a manual dispensing mode in which the first valve(s) is/are selectively opened in response to a user operation, the second valve is maintained closed, the integrated three-way valve is operated to allow at least some flow into the dispensing portion of the water recirculation loop, and the pump is operated; and/or
   an automatic dispensing mode in which the first valve(s) is/are selectively opened until a predetermined volume of the water is dispensed from the respective outlet, the second valve is maintained closed, the integrated three-way valve is operated to allow at least some flow into the dispensing portion of the water recirculation loop, and the pump is operated.

7. The system according to claim 6, wherein a flow meter is located on the dispensing portion of the recirculation loop upstream of each first valve for measuring the flow rate into the respective first valve.

8. The system according to claim 6, wherein the control unit is arranged to perform the automatic dispensing mode, is arranged to open the first valve of the respective outlet in response to a user operation, is arranged to monitor the flow rate measured by the flow meter after the opening of the first valve, and is arranged to close the first valve after it is determined based on the monitored flow rate, that the predetermined volume of water has been dispensed from the associated outlet.

9. The system according to claim 6, wherein the control unit is arranged to perform the automatic dispensing mode, is arranged to open the first valve of the respective outlet in response to a user operation, is arranged to monitor the time after the opening of the first valve, and is arranged to close the first valve after it is determined based on the monitored time, that the predetermined volume of water has been dispensed from the associated outlet.

10. The system according to claim 6, wherein the control unit is arranged to operate the integrated three-way valve to adjust, to a predetermined value, the pressure of the water in the dispensing portion of the water recirculation loop.

11. The system according to claim 6, wherein the control unit is arranged to operate the pump in a substantially constant supply rate in the respective operation modes.

12. The system according to claim 1, wherein said first valve(s) is/are solenoid valves of the type with a normally closed (NC) flow path.

13. A method of operating a water purification and dispensing system according to claim 1, comprising:
- a recirculation mode in which the first valve(s) is/are maintained closed, the second valve is maintained opened, the integrated three-way valve is operated to substantially prevent the flow through the bypass passage, and to allow flow into the dispensing portion of the water recirculation loop, and the pump is operated; and/or
- a manual dispensing mode in which the first valve(s) is/are selectively opened in response to a user operation, the second valve is maintained closed, the integrated three-way valve is operated to allow at least some flow into the dispensing portion of the water recirculation loop, and the pump is operated; and/or
- an automatic dispensing mode in which the first valve(s) is/are selectively opened until a predetermined volume of the water is dispensed from the respective outlet, the second valve is maintained closed, the integrated three-way valve is operated to allow at least some flow into the dispensing portion of the water recirculation loop, and the pump is operated.

14. The system according to claim 12, wherein said second valve is a solenoid valve of the type with a normally closed (NC) flow path.

* * * * *